United States Patent [19]

Hunger et al.

[11] Patent Number: 4,476,052
[45] Date of Patent: Oct. 9, 1984

[54] AZO PIGMENT HAVING IMPROVED HIDING POWER AND A PROCESS FOR ITS PREPARATION

[75] Inventors: Klaus Hunger, Kelkheim; Joachim Ribka, Offenbach am Main; Friedrich Weingarten, Liederbach; Wolfgang Rieper, Frankfurt am Main, all of Fed. Rep. of Germany

[73] Assignee: Farbwerke Hoechst Aktiengesellschaft, Frankfurt am Main, Fed. Rep. of Germany

[21] Appl. No.: 357,287

[22] Filed: Mar. 11, 1982

Related U.S. Application Data

[63] Continuation of Ser. No. 025,051, Mar. 29, 1979, abandoned, which is a continuation of Ser. No. 683,776, May 6, 1976, abandoned, which is a continuation of Ser. No. 434,004, Jan. 17, 1974, abandoned.

[30] Foreign Application Priority Data

Jan. 19, 1973 [DE] Fed. Rep. of Germany ....... 2302516

[51] Int. Cl.³ .................. C09B 29/32; C09B 29/33; C09D 3/00; C09D 11/02
[52] U.S. Cl. ................. 260/157; 106/288 Q; 106/308 Q; 106/309; 260/208
[58] Field of Search .............. 260/208; 106/288 Q, 106/308 Q, 309

[56] References Cited

U.S. PATENT DOCUMENTS

| | | | |
|---|---|---|---|
| 3,124,565 | 3/1964 | Schilling et al. | 260/157 |
| 3,137,686 | 6/1964 | Dietz et al. | 260/157 |
| 3,169,955 | 2/1965 | Siebert et al. | 260/176 |
| 3,523,030 | 8/1970 | Malin et al. | 106/288 Q |
| 3,555,002 | 1/1971 | Ribka et al. | 260/157 |
| 3,711,461 | 1/1973 | Pretzer et al. | 260/154 |
| 3,849,394 | 11/1974 | Roueche et al. | 260/155 |
| 3,991,044 | 11/1976 | Conley | 260/176 |
| 4,003,886 | 1/1977 | Muller | 260/176 |

FOREIGN PATENT DOCUMENTS 1227585  10/1966  Fed. Rep. of Germany ...... 260/157

OTHER PUBLICATIONS

Carr, "Pigment Handbook", vol. III, Characterization and Physical Relationships, p. 29, (1973).

Primary Examiner—Floyd D. Higel
Attorney, Agent, or Firm—Curtis, Morris & Safford

[57] ABSTRACT

Process for the aftertreatment of the azo pigment of the formula

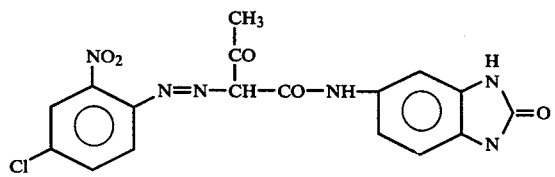

C.I. PIGMENT ORANGE 36 wherein the crude pigment obtained after coupling is heated to temperatures from 100° to 150° C. in dry or wet condition in a solvent which is water-immiscible or not indefinitely water-miscible and the pigment is isolated in known manner. The pigment aftertreated in this way shows substantially improved hiding power while the same pigment prepared in the usual way has poor hiding power and can not be used in stoving lacquers.

18 Claims, No Drawings

AZO PIGMENT HAVING IMPROVED HIDING POWER AND A PROCESS FOR ITS PREPARATION

This is a continuation of copending application Ser. No. 025,051 filed Mar. 29, 1979, now abandoned, which is a continuation of application Ser. No. 683,776 filed May 6, 1976, now abandoned, which is a continuation of application Ser. No. 434,004 filed Jan. 17, 1974, now abandoned.

The pigment of the formula

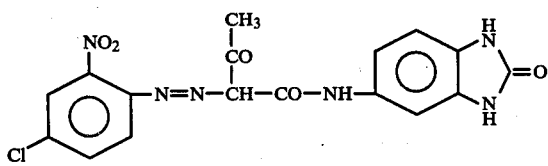

which has been obtained by the diazotization of 1-amino-2-nitro-4-chlorobenzene and by coupling to 5-acetoacetylaminobenzimidazolon, first appears in hard-grained form. In order to be converted into a soft-grained form, an aftertreatment is necessary which consists, for example, in heating the aqueous crude pigment suspension obtained after coupling for several hours to temperatures ranging from 80° to 150° C. Thereby, the pigment is obtained in a soft-grained, but very transparent form which is primarily suitable for the use in printing inks.

The use of the pigment aftertreated in this form for lacquers used in full shade lacquering is not possible due to its high requirement of binding medium which is due to the high proportion of extra fine grains. The high absorption of binding medium only permits pigment concentrations in the lacquer which do not exceed 5%. Higher concentrations lead to highly viscous pastes with low fluidity that can hardly be processed and their stoving lacquerings have no surface luster.

Now, a process has been found for the preparation of the azo pigment of above formula, which has optimal hiding power, a very good flow characteristic in the lacquer, even in concentrations above 5%, and high luster. This process is characterized by heating the pigment obtained after coupling in an organic solvent—which is either immiscible with water or not indefinitely miscible with it—at temperatures from 80° to 180° C., preferably from 100° to 150° C. For this purpose, the organic solvent is added to the pigment suspension obtained after the synthesis, or the wet press cake (first separated by filtration and washed free of salt) or the dried crude pigment are subsequently suspended in a mixture of water and an organic solvent which is immiscible with water or not indefinitely miscible with it.

The pigment content in this suspension is about 2 to 10, preferably 5 to 8% by weight. The proportion of the organic solvent as compared with the total amount of liquid is between 10 and 100% by weight. A mixture is preferred which contains equal parts of water and the organic solvent.

This suspension is heated for some time to temperatures above 100° C., preferably to temperatures between 120° and 150° C. The duration of this heat treatment depends on the selected temperature and the organic solvent. The higher the temperature and the amount of solvent, the shorter is the time required for heating.

The duration of treatment varies between 10 minutes and 3 hours. The reaction conditions required to obtain optimal hiding power can be determined, for example, by test planning in the plant.

As organic, water-immiscible or not indefinitely water-miscible solvents, higher alcohols with 4 to 8 C-atoms such as isobutanol are particularly suitable. Also useful are chlorobenzene and other halogenated aromatic compounds such as o-dichlorobenzene, and aromatic nitro-compounds such as nitrobenzene, aromatic ethers as, for example, anisole or phenetole as well as esters of aromatic acids like benzoic methyl ester or benzoic ethyl ester, and ketones such as methyl-iso-butyl-ketone or methyl-iso-propyl ketone. The term "not indefinitely water-miscible solvents" refers to those solvents whereof at most 20 g are miscible with 100 g of water.

The isolation of the prepared pigment is preferably carried out by filtration from the aqueous suspension after the organic solvent has been distilled off by the introduction of steam. The solvent can be used for further batches without any additional purification. No losses of solvents occur when the filtration is effected from the aqueous suspension.

The azo pigment obtained according to the process of this invention is primarily suitable for the dyeing of stoving lacquers, plastic materials and special printing pastes, for example in sheet metal printing. The materials dyed with this pigment show a substantially improved hiding power and increased fastness to light as compared with materials dyed with untreated pigment. Stoving lacquers prepared with this new pigment have a substantially pure shade, excellent luster and good rheological properties, even if they are highly pigmented.

EXAMPLE

120 Grams of dyestuff paste containing about 25% of dyestuff, which had been obtained by coupling diazotized 2-nitro-4-chloro-aniline with 5-acetoacetylaminobenzimidazolone, was mixed by stirring with 140 grams of isobutanol and 190 ml of water, heated in a closed vessel to 125° C. and maintained at this temperature for 45 minutes. Then, the isobutanol was distilled off at about 90° to 100° C. by the injection of steam, and the water which had distilled over during distillation flowed back into the distilling vessel. The pigment was separated from the remaining aqueous suspension by filtration and then was dried. An orange-colored powder with strong hiding power, good rheological properties and high luster in stoving lacquers was obtained.

We claim:

1. An azo pigment product having high hiding power made by the process which comprises providing a crude pigment resulting from coupling which is of the formula

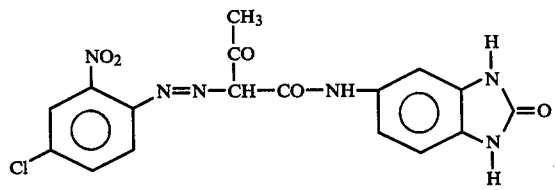

heating the crude pigment to a temperature in the range of from 100° to 150° C. in (a) an organic solvent, which is miscible with water to an extent no greater than 20 grams of solvent per 100 grams of water, and is selected from the group consisting of higher alcohols from 4 to 8 carbon atoms, halogenated aromatic compounds, aromatic nitro compounds, aromatic ethers, esters or aromatic acids and ketones, or (b) a mixture of such an organic solvent with water, said mixture containing at least 10 percent by weight of solvent, and isolating said azo pigment product.

2. A pigment as claimed in claim 1, wherein in said process the solvent of the solvent/water mixture is separated by steam distillation before isolating the pigment.

3. A pigment as claimed in claim 1, wherein in said process the organic solvent is added to a suspension of the pigment obtained after coupling.

4. A pigment as claimed in claim 1, wherein in said process a wet press cake of the pigment is washed salt-free and suspended in a mixture of water and said organic solvent.

5. A pigment as claimed in claim 1, wherein in said process the pigment in dry crude form is suspended in a mixture of water and said organic solvent.

6. A pigment as claimed in claim 1, wherein in said process the pigment concentration in the mixture of water and organic solvent is 2 to 10% by weight.

7. A pigment as claimed in claim 6, wherein in said process the pigment concentration is 5 to 8% by weight.

8. A pigment as claimed in claim 1, wherein in said process the mixture consists of equal parts of water and organic solvent.

9. A pigment as claimed in claim 1, wherein in said process the temperature is from 120° to 150° C.

10. A process for the obtention of an azo pigment product having high hiding power, which comprises heating a crude azo pigment having the formula

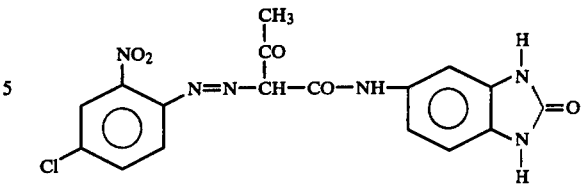

to a temperature in the range of from 100° to 150° C. in (a) an organic solvent, which is miscible with water to an extent no greater than 20 grams of solvent per 100 grams of water, and is selected from the group consisting of higher alcohols of from 4 to 8 carbon atoms, halogenated aromatic compounds, aromatic nitro compounds, aromatic ethers, esters of aromatic acids and ketones, or (b) a mixture of such an organic solvent with water, said mixture containing at least 10 percent by weight of said solvent, and isolating said azo pigment product.

11. A process as claimed in claim 10, wherein the solvent of the solvent/water mixture is separated by steam distillation before isolating the pigment.

12. A process as claimed in claim 10, wherein said organic solvent is added to a suspension of the pigment obtained after coupling.

13. A process as claimed in claim 10, wherein a wet press cake of the pigment is washed salt-free and suspended in a mixture of water and said organic solvent.

14. A process as claimed in claim 10, wherein the pigment in dry crude form is suspended in a mixture of water and said organic solvent.

15. A process as claimed in claim 10, wherein the pigment concentration in the mixture of water and organic solvent is 2 to 10% by weight.

16. A process as claimed in claim 15, wherein the pigment concentration is 5 to 8% by weight.

17. A process as claimed in claim 10, wherein the mixture consists of equal parts of water and organic solvent.

18. A process as claimed in claim 10, wherein the temperature is from 120° to 150° C.

* * * * *